S. CARO.
Bedsteads.
No. 5,275. Reissued Feb. 11, 1873.
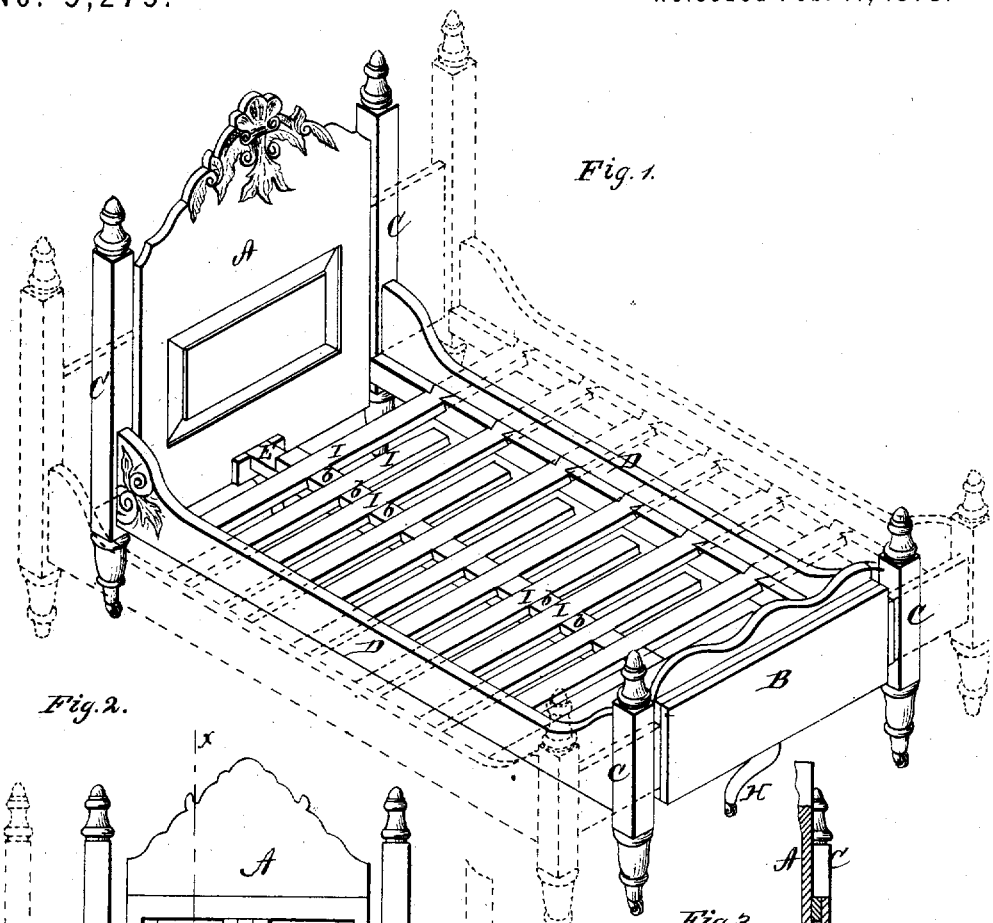
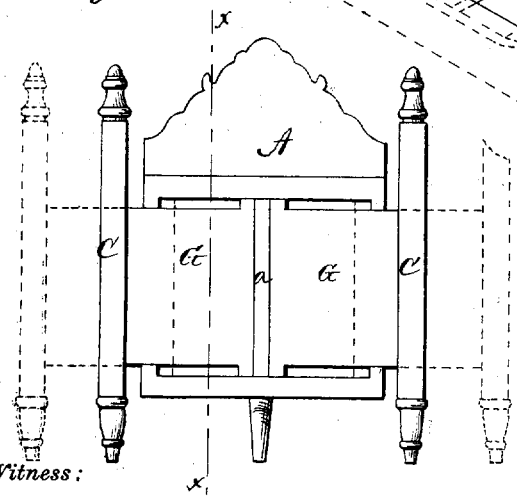
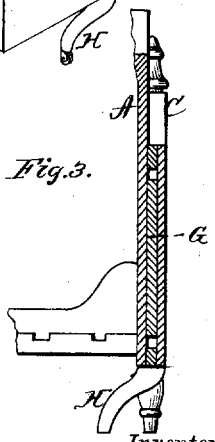
Witness:
Mich Hoffa
John T. Lacey.
Inventor.
Simon Caro
AM. PHOTO-LITHOGRAPHIC CO. N.Y. (OSBORNE'S PROCESS.)

UNITED STATES PATENT OFFICE.

SIMON CARO, OF WASHINGTON, DISTRICT OF COLUMBIA.

IMPROVEMENT IN BEDSTEADS.

Specification forming part of Letters Patent No. 134,359, dated December 31, 1872; reissue No. 5,275, dated February 11, 1873.

*To all whom it may concern:*

Be it known that I, SIMON CARO, of the city of Washington, in the District of Columbia, have invented certain new and useful Improvements in Bedsteads; and do hereby declare the following to be a full, clear, and exact description thereof, reference being had to the accompanying drawing and to the letters of reference marked thereon.

The nature of my invention consists in the construction and arrangement of a bedstead which can be extended sidewise so as to form either a single or double bed, as desired, as will be hereinafter more fully set forth.

In order to enable others skilled in the art to which my invention appertains to make and use the same, I will now proceed to describe its construction and operation, referring to the annexed drawing which forms a part of this specification, and in which—

Figure 1 is a perspective view of my bedstead. Fig. 2 is a rear view of the same with the outer portion of the head-board removed; and Fig. 3 is a transverse vertical section through line *x x*, Fig. 2.

A represents the head-board; B, the foot-board; C C, the posts; and D D, the side rails of my bedstead. These parts may be made plain and ornamented, and of any size desired, according to the size of the bed wanted. The side rails D D are attached to their respective posts C in any of the known and usual ways. The posts C C, however, are not attached to or form part of the head and foot boards, as is usually the case, but are separate therefrom, and have each, on its inner side, a board or wing, G, attached to it, which wings are to slide in the end boards. The end boards A and B are, for this purpose, made double, with sufficient space between the two walls to allow of these wings G G sliding back and forth, said wings entering the hollow end boards at their ends, as shown in the drawing. In the center of the space in each end board is a vertical slat or partition, *a*, to prevent the wing from one side from interfering with the wing on the other side. The slat or partition *a* may be made in two halves lengthwise, and one part attached to the inner side of each wall, and thereby keep the same from warping, yet, when put together, form one slat or partition. I I represent the slats, which are attached alternately to the two side pieces D D by dovetailed joints, or other suitable means, so that the slats will follow their respective side rails as they may be moved out or in. The slats I I rest upon a center bar, E, connecting the head and foot boards, as shown, and on said center bar, between the slats, are guide-blocks *b b* to prevent them from coming out of their regular places.

A bedstead constructed in this manner may be closed up to make a narrow single bed, or extended to make a wide double bed, and will be of great convenience, not only in hotels and boarding-houses, for which it is mainly designed, but also in private families.

Under the center of both the head and foot boards is a leg, H, to form center supports, which legs may be curved inward under the bed, and thus be out of sight.

Having thus fully described my invention, what I claim as new, and desire to secure by Letters Patent, is—

1. The hollow head and foot boards A B, open at both ends, and provided each with a central slat or partition, *a*, in combination with the posts C C, side rails D D, and wings G G, said wings being attached to the posts and sliding in the hollow head and foot boards, substantially as and for the purposes herein set forth.

2. In combination with the head and foot boards and side rails of a bedstead, capable of extension sidewise, the slats I I, attached alternately to the side rails, and the center bar E connecting the head and foot boards and supporting the slats, and provided with guide-blocks *b b*, between which the slats move, all as and for the purposes herein set forth.

3. In combination with the posts and side rails of a bedstead, the double or hollow head and foot boards A B, wings G G attached to the posts and sliding in said head and foot boards, the vertical partition *a*, the slats I I attached alternately to the side rails and resting upon the center bar E having guide-blocks *b b*, and the central foot H, all constructed as described, and for the purposes set forth.

In testimony that I claim the foregoing I have hereunto set my hand this 5th day of February, 1873.

SIMON CARO.

Witnesses:
MICH. HOFFA,
ADOLPH GOETZ.